US006397063B1

(12) United States Patent
Sessions et al.

(10) Patent No.: US 6,397,063 B1
(45) Date of Patent: May 28, 2002

(54) AIR-SURFACE TEST SYSTEM AND METHOD TO EVALUATE POTENTIAL WIRELESS BASE STATION SITES

(75) Inventors: Drew Sessions, Del Ray Beach, FL (US); Vernon Meadows, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/821,864

(22) Filed: Mar. 30, 2001

(51) Int. Cl.[7] .............................................. H04B 17/00
(52) U.S. Cl. ...................................... 455/425; 456/67.4
(58) Field of Search ................................. 455/423, 424, 455/425, 67.1, 67.4, 67.6, 507, 517, 456, 457, 11.1

(56) References Cited

U.S. PATENT DOCUMENTS

| 4,009,375 | A | * | 2/1977 | White et al. | 455/517 |
| 5,793,813 | A | | 8/1998 | Cleave | |
| 5,896,569 | A | * | 4/1999 | Butler et al. | 455/425 |

OTHER PUBLICATIONS

Neil J. Boucher, The Cellular Radio Handbook: A Reference for Cellular System Operation, Third Edition, 1995, Quantum Publishing, Inc., Mill Valley, CA.
Paul Bedell, Cellular/PCS Management, 1999, pp. 24–27, McGraw–Hill, New York, NY.

* cited by examiner

Primary Examiner—Thanh Cong Le
(74) Attorney, Agent, or Firm—Kilpatrick Stockton LLP

(57) ABSTRACT

The air/surface test system is the first mobile, self-contained apparatus that include telecommunications and automatic position-locating test equipment attached to an aircraft secured to the surface and that is used to accurately evaluate wireless field strengths and locate potential wireless base station sites. The test equipment includes a transmitter, an antenna, and an automatic position-locating system, and is used to simulate a potential base station antenna. Once the test equipment is positioned at a selected elevation, the transmitter produces propagation test signals that are selectively broadcast from the antenna. At the same time, the automatic position-locating system receives and broadcasts signals that are used to calculate near-precise positioning data, such as longitude, latitude, altitude, time, geographic position, speed, and direction of travel data, associated with the test equipment. Thus, the field strengths as well as the positioning data are measured and recorded each time a reading from the test equipment is taken and are used to reconcile aerodynamic and elevation changes, such as changes caused by swaying and/or diving during gusts of wind, to provide reliable field strength data. The test equipment receives, processes, and/or transmits test propagation signals that may include the Industrial, Scientific, and Medical (ISM) Band frequencies, such as, 2.4–2.5 GHz, cellular telephone frequencies, such as, 806–960 MHz, 1710–1855 MHz, and 2500–2690 MHz, paging frequencies, digital processing frequencies, and any other frequency in the electromagnetic spectrum. Once the test survey is completed, the air/surface test system is quickly and easily moved to the next potential site, and therefore, allows wireless service providers to rapidly, inexpensively, and efficiently locate wireless communications equipment.

34 Claims, 6 Drawing Sheets

AIR-SURFACE TEST SYSTEM AND METHOD TO EVALUATE POTENTIAL WIRELESS BASE STATION SITES

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention relates generally to the field of wireless communications and includes telecommunications and automatic position-locating equipment attached to an aircraft secured to the surface. More particularly, this invention is useful for accurately evaluating wireless field strengths at various elevations of potential wireless base station sites.

2. Description of the Related Art

Wireless communication has experienced explosive growth. In just a few years cellular telephone usage has soared, and more growth is planned as wireless Internet access improves. This explosive growth has revolutionized data and voice communication.

This explosive growth, however, presents a challenge for wireless service providers. As cellular communication soars in use, more cellular base stations are required. These base stations house equipment for transmitting, receiving, and processing wireless communications to a communications network. Each base station covers a geographic sector, or "cell," and each cell varies in size depending upon the terrain and the number of users. As use of wireless services grows, more cells are needed and, hence, more base stations are required.

Choosing the location for a new base station, however, is extremely complicated. The location of the base station largely determines the quality and range of the cell's signal coverage. The location of the base station is important because radio waves propagate according to natural laws and not city boundaries. See NEIL J. BOUCHER, THE CELLULAR RADIO HANDBOOK 42 (1995). The tall buildings of urban areas, for example, can both confine radio waves and also cause reflections. See id. at 44. Thus the final location of a base station is often a process of evaluating many potential sites and choosing the location that offers the best compromise of many considerations. See PAUL BEDELL, CELLULAR/PCS MANAGEMENT 24–27 (1999).

Often these potential base station sites are located atop urban buildings or radio towers. Engineers must somehow evaluate the quality and range of a base station signal transmitted from atop a selection of potential buildings or towers. As most cellular designers recognize, the most reliable field strength measurements are obtained when signals are broadcast from the actual site itself (e.g., the roof of the desired building). The field strengths could be estimated using mathematical formulae, but these formulae require several correction factors. See BOUCHER, supra, at 59. An actual transmission from or near the potential site, called a "survey," is therefore necessary to accurately evaluate cellular transmission and reception.

A method of evaluating the communication paths of an elevated antenna uses a crane or cherry picker. The conventional method involves bringing a large crane or cherry picker to the potential base station site, and hoisting a boom with an attached antenna to a selected elevation. A transmission is made from the antenna at that elevation, and the field strengths of the transmission are measured at various points within the potential cell.

A crane/cherry-picker, however, is an impractical method of hoisting the antenna. Cranes and cherry pickers, because of their large size, are cumbersome. This heavy equipment is extremely difficult to maneuver within tight, urban locations. Cranes and cherry-pickers also block large portions of any roadway and exacerbate traffic congestion. Bridges and low-clearance tunnels may pose delivery concerns. Utility lines may need to be removed and rerouted to accommodate the boom's large size. Cranes and cherry-pickers, in short, are so large that this conventional method is often impractical.

Cranes and cherry-pickers are also very expensive to operate. Because this heavy equipment must often be rented from an independent operator, the rental charges can be hundreds of dollars per hour. Any removed and/or rerouted utility lines are an added and unnecessary expense that increase the cost of a survey. Cranes and cherry-pickers, in fact, have been said to unnecessarily double the cost of any survey. See BOUCHER, supra, at 87.

Cranes and cherry-pickers also frequently result in unexpected expenses. Cost overruns occur despite even the best projections. The weight of heavy equipment often damages blacktop streets. Water mains and gas mains can rupture from this same weight. Buildings are damaged from an errant boom or hoisted antenna. The antenna itself has been known to unexpectedly release and fall from the boom. Falling antennas obviously endanger both workers and pedestrians.

Another method of evaluating the signal strength of a potential base station site uses a helicopter. The helicopter lifts the antenna to the desired elevation and hovers while field strength measurements are performed. A helicopter, however, is extremely expensive and its costs are usually only justified for remote and undeveloped mountainous locations or for locations over water.

A final method of evaluating the signal strength of a potential base station site utilizes alternative air vehicles. See BEDELL, supra, at 25; BOUCHER, supra, at 87. For example, transmitting equipment is attached to a blimp or to a balloon that is tethered at the potential base station site and floated to the desired height. While balloons can be easily floated to the desired height, this method, however, is very susceptible to gusting wind. Although the blimp or balloon can be tethered by multiple ropes, the increased number of ropes alters the aerodynamics and causes the balloon or blimp to sway and dive during gusts of wind. Thus, conventional methods using alternative air vehicles have not yielded reliable field strength measurements.

The conventional methods described above are inherently inefficient. There is, accordingly, a need for an apparatus which can quickly be used to measure cell site field strength, which is easy to maneuver between potential cell sites, which promotes efficient field strength testing, and which is cost effective to implement.

BRIEF SUMMARY OF THE INVENTION

The aforementioned problems are minimized by using mobile, lightweight transmission and position-locating test equipment that is securely housed in a protective carrier and attached to an aircraft secured to the surface, such as a balloon securely tethered with guide equipment to a flatbed truck. This transmission and position-locating test equipment is used to accurately evaluate field strengths at various elevations of potential base station sites. Once the survey measurements are completed for the site, the air/surface test equipment is quickly and easily relocated to the next potential site. The air/surface test, therefore, provides much quicker testing than conventional methods.

The test equipment makes use of and includes a transmitter, an antenna, and an automatic position-locating system. In a preferred embodiment, the total weight of the test equipment, the protective carrier, and the stabilizing equipment used to securely attach and position the protective carrier to the aircraft is less than fifty-five pounds. Further, the test equipment may be powered by a connected cable that runs from a surface generator along a tether to the aircraft.

The aircraft of the air/surface test may be tethered to a ground transportation vehicle, such as a truck that can navigate over roads and highways, or it may be tethered to a water transportation vehicle, such as a boat that can navigate waterways. Alternatively, the aircraft may be tethered to the surface itself, such as, for example securing a tether(s) to the ground with a stake(s). Guide equipment for securely attaching and positioning the aircraft from the surface includes one or more tethers, a winching system connected to a tether that is used to raise and lower the aircraft, optionally, one or more pulleys to guide additional tethers (when multiple tethers are used), and additional equipment to securely affix and anchor the tether(s) to the surface terrain or to the surface vehicle.

The aircraft of the air/surface test may be a helium balloon or a blimp that is large enough to support the test equipment. Once inflated, a helium balloon or blimp could be used to conduct surveys for up to 48–72 hours (depending on the shelf-life of the helium). Further, the air/surface test system may include safety devices, such as, for example, a strobe light on the aircraft or a tear away device that automatically deflates a balloon or blimp if a tether(s) is severed.

In a preferred embodiment, the air/surface test makes use of and includes a helium balloon that is tethered to three fold-out arms on a flatbed truck. The fold-out arms extend approximately fifteen to twenty feet from the middle of the truck's flatbed and are positioned in a triangular arrangement from each other. A winching system is affixed on the flatbed and connected to a tether at the end of ones of the arms. The other two tethers are connected to the ends of the other two arms with pulley systems.

The transmitter produces test propagation signals that are selectively broadcast from the antenna. The position-locating system receives and broadcasts signals that are used to calculate near-precise positioning data, such as longitude, latitude, altitude, time, geographic position, speed, and direction of travel data, associated with the test equipment. Thus, the field strengths as well as the positioning data are measured and recorded each time a reading from the test equipment is taken, and they are used to reconcile aerodynamic and elevation changes, such as changes caused by swaying and/or diving during gusts of wind, to provide reliable field strength data for locating potential base station sites. In addition, communications network interface equipment may be used to process and reconcile the test propagation and position-locating signals.

The air/surface test broadcasts various test propagation signals and position-locating signals. Test propagation signals may include the Industrial, Scientific, and Medical (ISM) Band frequencies, such as, 2.4–2.5 GHz, cellular telephone frequencies, such as, 806–960 MHz, 1710–1855 MHz, and 2500–2690 MHz, paging frequencies, digital processing frequencies, and any other frequency in the electromagnetic spectrum. The type of antenna used to transmit the test signals may be directional or omni-directional. In addition, the type of automatic position-locating system used is preferably a global positioning system (GPS).

The air/surface test is significantly less expensive than conventional methods. Because the air/surface test system is the first mobile, self-contained apparatus that makes use of an aircraft securely attached to a transportation vehicle for evaluating potential sites, it eliminates the costly and unnecessary rental expenses of using conventional systems, such as a crane or cherry picker. The mobile, flexible design of the air/surface test system also substantially eliminates the unexpected damage-related expenses of the cumbersome conventional methods.

The air/surface test also yields more efficient testing. Because the air/surface test system is mobile and self-contained, the air/surface test system can be quickly and easily moved between potential cell site locations. Also, because the air/surface test system may include an aircraft tethered to a boat, the air/surface test system can be used to test potential cell sites above aquatic terrain. Further, the air/surface test allows cellular designers to conduct more tests in a work week, and the designers can quickly and easily move the air/surface test system to the next potential location. The air/surface test thus promotes more efficient testing, and the total cost of a survey is substantially reduced.

BRIEF DESCRIPTION OF THE DRAWINGS

These and other features, aspects, and advantages of the air/surface test system and method are better understood when the following Detailed Description of the Invention is read with reference to the accompanying drawings, wherein.

DETAILED DESCRIPTION OF THE INVENTION

The air/surface test system is the first mobile, self-contained apparatus that includes telecommunications and automatic position-locating test equipment attached to an aircraft secured to the surface and is used to accurately evaluate wireless field strengths at various elevations of potential wireless base station sites. The test equipment includes a transmitter, an aritenna, and an automatic position-locating system, and it is used to simulate a potential base station antenna. Once the test equipment is positioned at a selected elevation, the transmitter produces propagation test signals that are selectively broadcast from the antenna. At the same time, the automatic position-locating system receives and broadcasts signals that are used to calculate near-precise positioning data, such as longitude, latitude, altitude, time, geographic position, speed, and direction of travel data, associated with the test equipment. Thus, the field strengths as well as the positioning data are measured and recorded each time a reading from the test equipment is taken and are used to reconcile aerodynamic and elevation changes, such as changes caused by swaying and/or diving during gusts of wind, to provide reliable field strength data. Preferably, the aircraft of the air/surface test system is a helium balloon or a blimp that is large enough to support the test equipment. Once inflated, a helium balloon or blimp can be used to conduct field strength surveys for up to 48–72 hours (depending on the shelf-life of the helium). After a test survey is completed, the air/surface test system is quickly and easily moved to the next potential site. The air/surface test system, therefore, provides quicker testing than conventional methods, and allows wireless service providers to rapidly, inexpensively, and efficiently locate wireless communications equipment.

Figure 1:
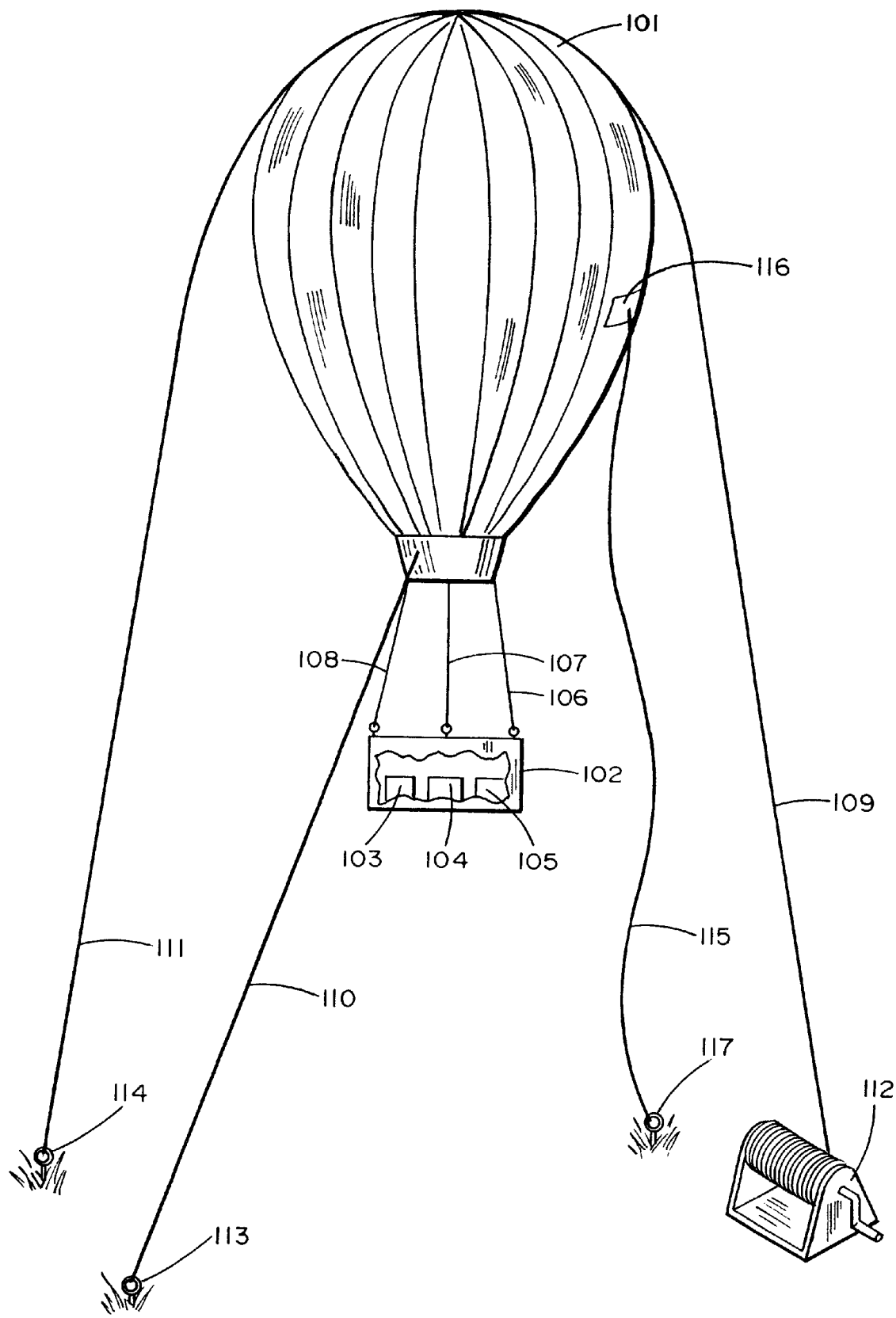
FIG. 1 is a schematic drawing of an embodiment of the present invention that includes and makes use of test equipment securely housed in a protective carrier that is attached to a balloon tethered to the terrain of a potential base station site.

FIG. 1 depicts an air/surface test system that includes and makes use of a balloon 101 attached to a protective carrier 102 that houses test equipment that including a transmitter 103, an antenna 104, and an automatic position-locating system 105. The protective carrier 102 is attached to the balloon 101 using stabilizing equipment that includes three cables 106–108. The protective carrier 102 is positioned at a selected elevation near a potential base station site using guide equipment that includes tethers 109–111. Tether 109 is connected to a winching system 112. The other two tethers, 110, 111, are connected to the ground using stakes 113, 114. A tear away system 115–117 is also attached to the balloon 101 and surface and serves as a safety device to automatically deflate the balloon 101 in case of an emergency.

Figure 2:
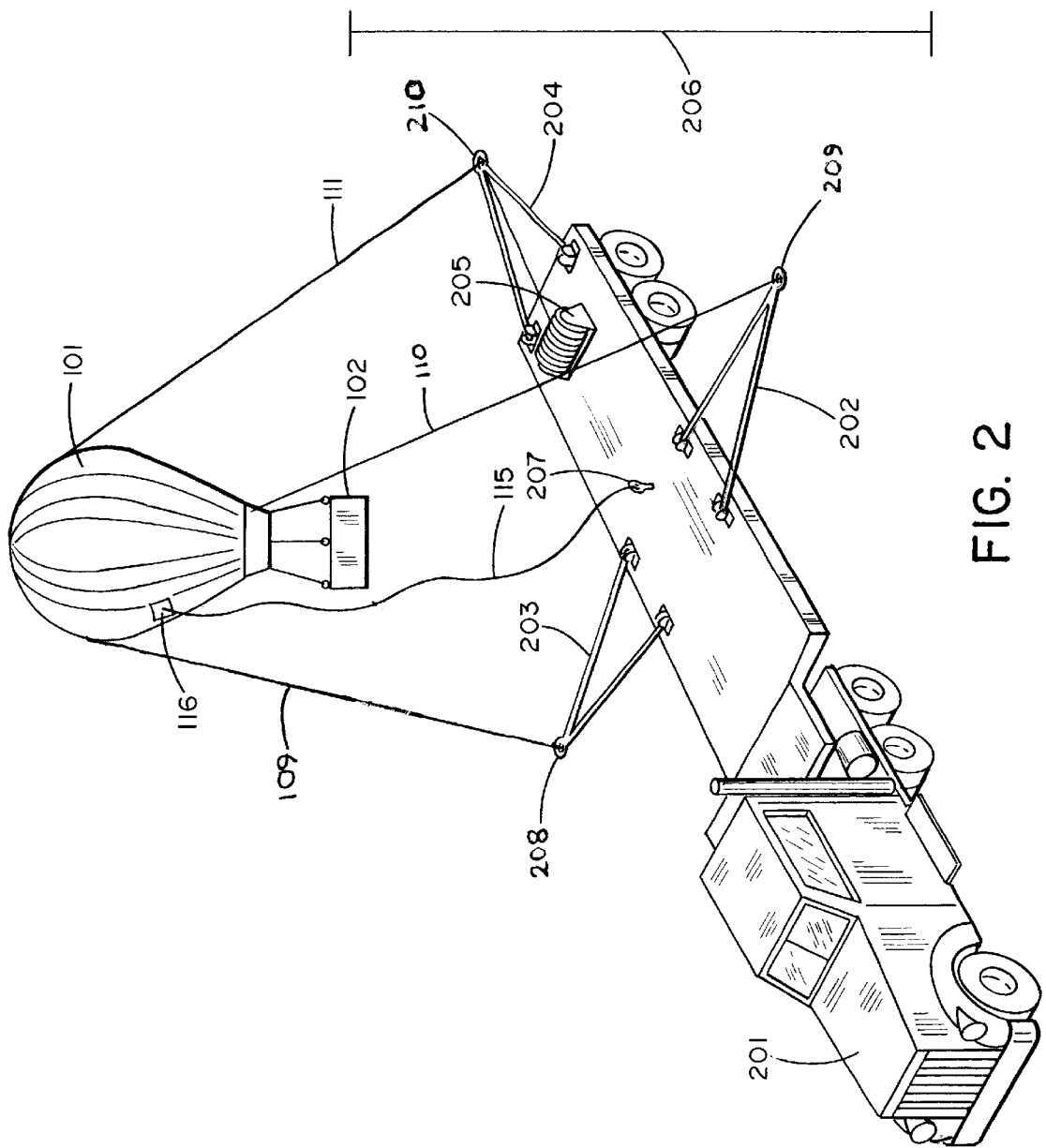
FIG. 2 is a schematic drawing of an embodiment of the present invention that includes and makes use of test equipment securely housed in a protective carrier that is attached to a balloon secured with three tethers to a flatbed truck located at a potential base station site.

FIG. 2 depicts the air/surface test system of FIG. 1; however, tethers 109–111 are anchored to three arms 202–204 of a flatbed truck 201. The arms 202–204 are made of a sturdy and rigid material, such as, for example, iron or steel beams, and are arranged to provide a safe anchoring system for the attached balloon 101. The arms 202–204 are extended approximately fifteen to twenty feet from the center of the truck 201 and arranged in a triangular fashion. A winch 205 is connected to tether 111 at the end 210 of arm 204. Tether 109 is connected at the end 208 of arm 203; tether 110 is connected at the end 209 of arm 202. A tear away system 115–116 is secured to the flatbed of the truck 201 using a hook connected to an eyebolt 207.

Turning now to a preferred embodiment of the air/surface test method, the truck 201 is driven and parked near the potential base station site, and the system of FIG. 2 is assembled. Once the selected elevation 206 of the protective carrier 102 is achieved, the transmitter 103 produces propagation test signals that are selectively broadcast from the antenna 104. At the same time, the automatic position-locating system 105 receives and broadcasts signals that are used to calculate near-precise positioning data, such as longitude, latitude, altitude, time, geographic position, speed, and direction of travel data, associated with the test equipment 103–105. Thus, the field strengths as well as the positioning data are measured and recorded each time a reading from the test equipment 103–105 is taken, and they are used to reconcile aerodynamic and elevation changes, such as changes caused by swaying and/or diving during gusts of wind, to provide reliable field strength data for locating potential base station sites.

Figure 3:
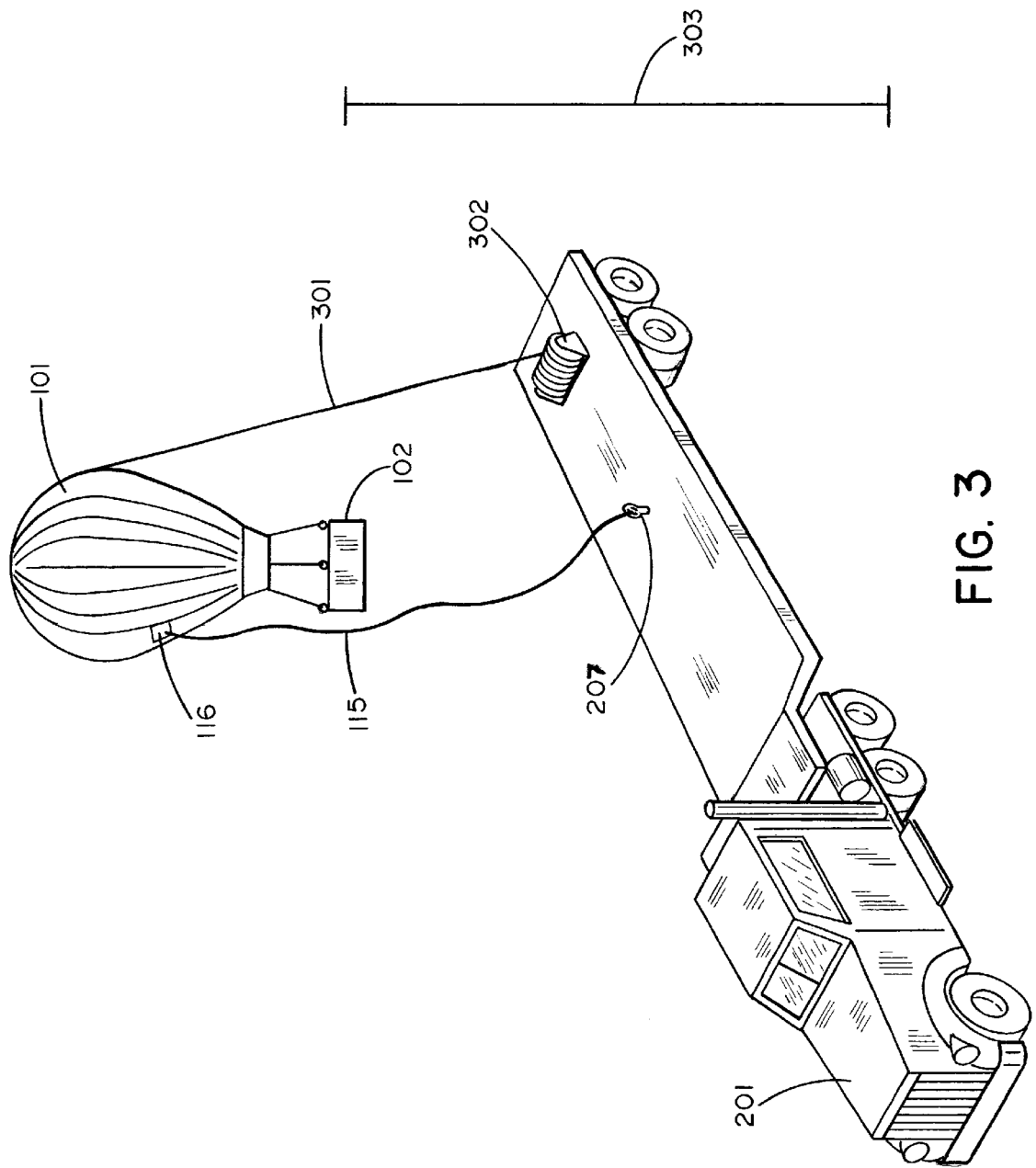
FIG. 3 is a schematic drawing of an embodiment of the present invention that includes and makes use of test equipment securely housed in a protective carrier that is attached to a balloon secured with one tether to a flatbed truck located at a potential base station site.

FIG. 3 is similar to the system of FIG. 2; however, the balloon 101 is attached to the truck 201 using a single tether 301 that is directly connected to the winch 302. Depending on winds, a single tether may provide a more stable system than multiple tethers. For example, experience indicates that multiple tethers 109–111 will help stabilize the balloon 101 in low winds, but will tend to push the balloon 101 towards the ground as the speed of the wind increases. In some instances, therefore, the air/surface test system with a single tether 301 may perform better than with multiple tethers 109–111.

Figure 4:
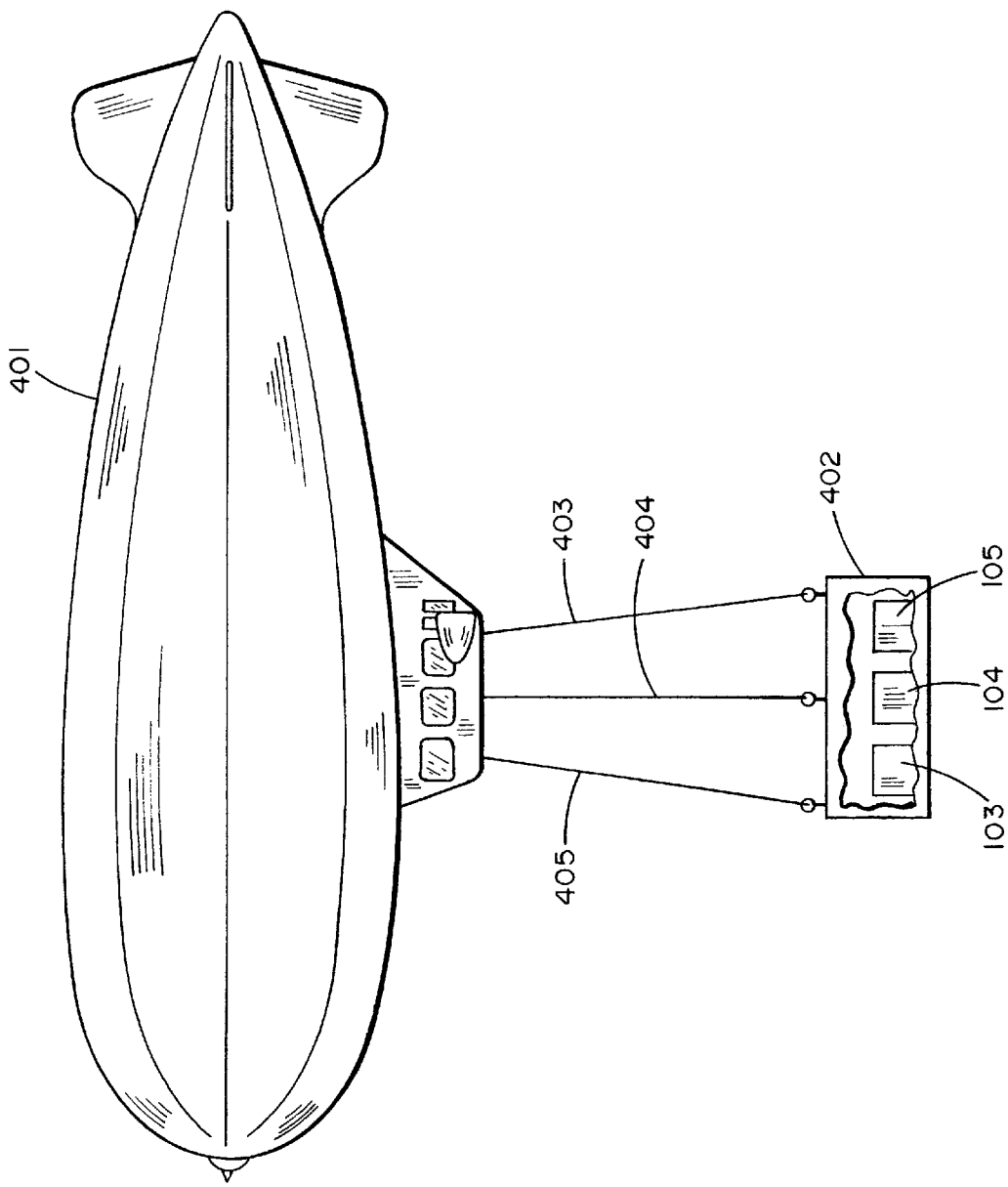
FIG. 4 is a schematic drawing of an embodiment of the present invention that includes and makes use of test equipment securely housed in a protective carrier that is attached to a blimp positioned over a potential base station site.

Alternative embodiments of the air/surface test can include the use of an aircraft other than a balloon 101. FIG. 4 shows the air/surface test with the test equipment 103–105 secured in protective carrier 402 attached to a blimp 401 with stabilizing equipment 403–405. The blimp 401 shown in FIG. 4 is representative of medium to heavy duty blimps that can support approximately fifty-five pounds and that are easily maneuvered in the air.

Figure 5:
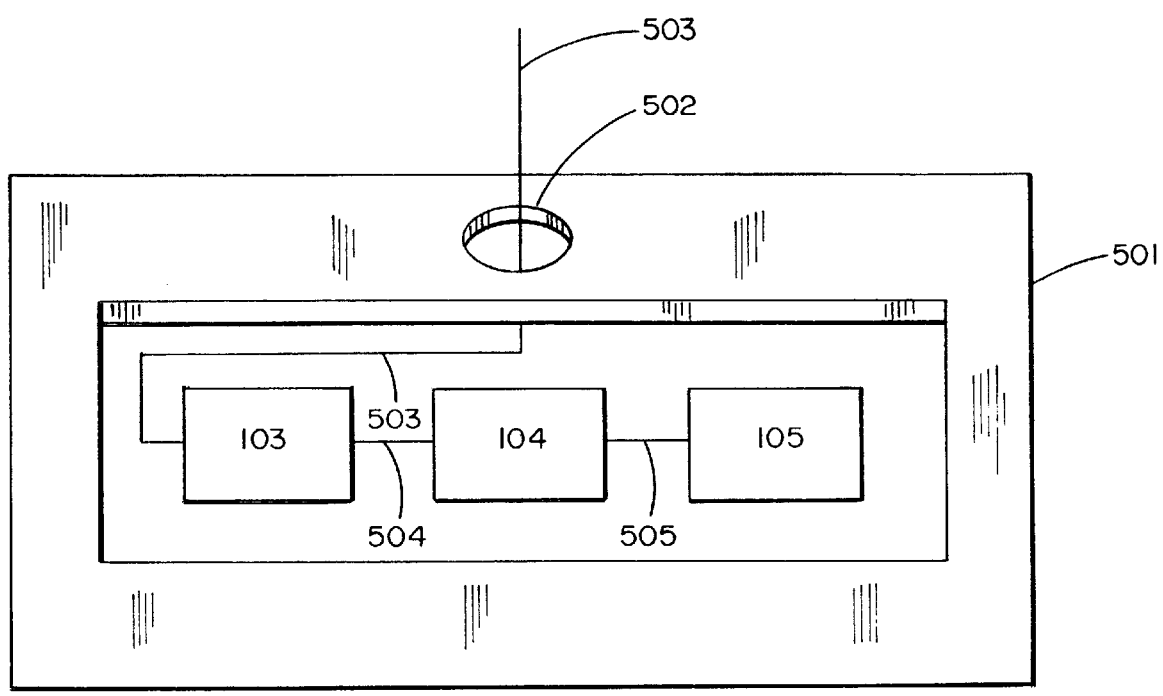
FIG. 5 is a schematic drawing that depicts a protective carrier that securely houses a transmitter, an antenna, and an automatic position-locating system in an embodiment of the present invention.

As illustrated in FIG.5, a protective carrier 501 may be a hollowed box that contains transmitter 103, antenna 104, and automatic position-locating system 105 that are coupled with each other using cables 504–505. The protective carrier 501 is preferably a light-weight, rigid material, such as wood or fiberglass. A separate cable 503 enters an opening 502 in the protective carrier 501 and is coupled with the test equipment 103–105 to provide power. Alternatively, the transmitter 103 could be positioned on the surface instead of in the protective carrier 501 with the antenna 104 and the automatic position-locating system 105.

The antenna 104 may be a directional or orni-directional antenna element to improve radiation. Preferably, the transmitter is an Omni 3 dBm gain or an Omni 10 dBm gain; however transmitter selection, as well as antenna selection, can vary. Further, the type of automatic position-locating system 105 used is preferably a global positioning system (GPS); however, automatic position-locating system selection can also vary.

Figure 6:
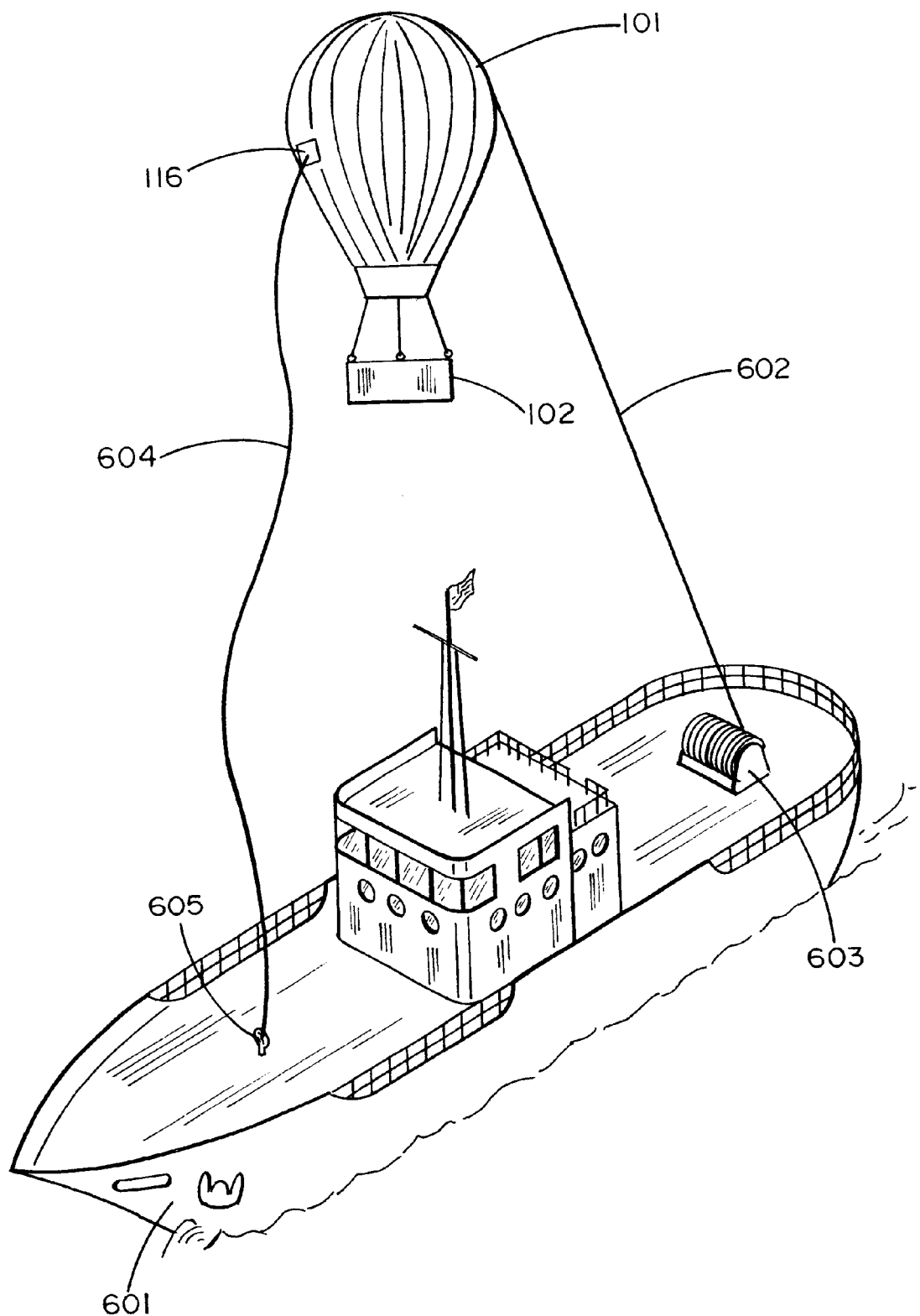
FIG. 6 is a schematic drawing of an embodiment of the present invention that includes and makes use of test equipment securely housed in a protective carrier that is attached to a balloon tethered to one position on a boat located at a potential base station site.

Alternative embodiments of the air/surface test can include the use of a surface vehicle other than a truck 201. FIG. 6 shows the air/surface test system attached to a boat 601 using a single tether 602 directly connected to a winching system 603 that controls raising and lowering the balloon 101. Tear-away system 116 is also attached to a secure connection 605 on the boat 601 using tether 604. The boat 601 is representative of medium to heavy-duty boats that can securely position the balloon 101 and that are easily maneuvered in the water.

In a preferred embodiment, the total weight of the test equipment 103–105, the protective carrier 102 (or 402 or 501) and the stabilizing equipment 106–108 (or 403–405), is less than fifty-five pounds. Further, the test equipment 103–105 is powered by a connected cable 503 that runs from a surface generator along a tether to the aircraft 101 (or 401).

In other various embodiments, the air/surface test system includes other useful components. For example, the air/surface test system may include safety devices, such as, for example, a strobe light on the aircraft. Another example is locking mechanisms on the winch and pulley systems.

Those skilled in the art recognize the air/surface test system and method is applicable to all wireless communication products, methods, and frequencies. The air/surface test system and method, for example, is equally applicable to wireless cellular/PCS phones, wireless computers and modems, wireless personal data assistants, global positioning devices, and any other wireless data/voice communication device. The air/surface test system and method is even applicable to satellite phones and satellite communication technology. The air/surface test system and method is applicable to code-division multiple access (CDMA) technologies, time-division multiple access (TDMA) technologies, and the global system for mobile communications (GSM) technology. The air/surface test system method is also applicable to all frequencies in the electromagnetic spectrum and is compatible with the June, 2000 World Radiocommunication Conference agreement on third-generation cellular telephony (806–960 MHz, 1710–1885 MHz, and 2500–2690 MHz). See William Sweet, Cell phones answer Internet's call, IEEE SPECTRUM, August 2000, at 43.

Various embodiments of the invention have been described in fulfillment of the features, aspects, and advantages of the invention. It should be recognized that these embodiments are merely illustrative of this invention. Numerous modifications and adaptations thereof will be readily apparent to those skilled in the art without departing from the spirit and scope of this invention.

What is claimed is:

1. An air/surface test system for evaluating field strengths of a potential site for wireless communications equipment to connect with a communications network, comprising:

(a) a transmitter capable of producing and communicating test propagation signals;

(b) an antenna capable of broadcasting said test propagation signals;

(c) an automatic position-locating system capable of transceiving positioning signals;

(d) an aircraft capable of being raised;

(e) a power source capable of providing power to one or more of said transmitter, said antenna, and said automatic position-locating system;

(f) guide equipment capable of positioning said aircraft from a surface to a test elevation; and (g) communications network interface equipment capable of processing said test propagation signals and said positioning signals with multiple receiving locations within a potential cell.

2. The system of claim 1, wherein said aircraft is used to position said antenna and said automatic position-locating system to said test elevation.

3. The system of claim 1, further comprising:

(h) a protective carrier capable of housing said antenna and said automatic position-locating system.

4. The system of claim 3, wherein said protective carrier is capable of housing said transmitter.

5. The system of claim 1, wherein said transmitter comprises said antenna.

6. The system of claim 1, wherein said test propagation signals comprise cellular telephone frequencies.

7. The system of claim 6, wherein said cellular telephone frequencies comprise 806–960 MHz.

8. The system of claim 6, wherein said cellular telephone frequencies comprise 1710–1855 MHz.

9. The system of claim 6, wherein said cellular telephone frequencies comprise 2500–2690 MHz.

10. The system of claim 1, wherein said test propagation signals comprise 2.4–2.5 GHz.

11. The system of claim 1, wherein said test propagation signals comprise any frequency signal in the electromagnetic spectrum.

12. The system of claim 1, wherein said positioning signals are used to evaluate one or more of the following:

(a) longitude;

(b) latitude;

(c) altitude;

(d) time;

(e) geographic position;

(f) speed; and (g) direction of travel.

13. The system of claim 1, wherein said guide equipment comprises:

(a) at least one tether;

(b) at least one winching system;

(c) at least one pulley system; and (d) anchoring equipment.

14. The system of claim 1, further comprising:

(i) a surface vehicle capable of transporting said aircraft; and (j) affixed to said surface vehicle, supplementary guide equipment capable of positioning said aircraft to said test elevation.

15. The system of claim 14, wherein said surface vehicle comprises a truck.

16. The system of claim 15, wherein said truck comprises a flatbed with multiple arms for attaching one or more tethers of said guide equipment.

17. The system of claim 16, wherein said aircraft comprises a balloon.

18. The system of claim 17, further comprising a tear away safety device to automatically deflate said balloon.

19. The system of claim 14, wherein said surface vehicle comprises a boat.

20. The system of claim 1, wherein said aircraft comprises a blimp.

21. The system of claim 1, wherein said power source comprises at least one of the following:

(a) a gasoline-powered generator;

(b) a solar-powered generator; and (c) an electrical-powered generator.

22. The system of claim 1, wherein said antenna comprises a directional array.

23. The system of claim 1, wherein said antenna comprises an omn-directional array.

24. The system of claim 1, wherein said automatic position-locating system is a mobile, lightweight global position system (GPS).

25. The system of claim 1, wherein said communications network comprises a celestial communications network.

26. The system of claim 1, wherein said communications network comprises a terrestrial communications network.

27. An air/surface test method for evaluating field strengths of a potential wireless base station site to connect with a communications network, comprising:

(a) using an aircraft attached to a surface to position an antenna and an automatic position-locating system at a substantially similar elevation as a proposed wireless communications antenna;

(b) transmitting test propagation signals from said antenna;

(c) transceiving positioning signals from said automatic position-locating system;

(d) receiving said test propagation signals at multiple locations within a potential wireless base station site; and (e) using said test propagation signals and said positioning signals to evaluate said propagation field strengths at each location within said potential wireless base station site.

28. The method of claim 27, wherein said aircraft is a balloon.

29. The method of claim 27, wherein said aircraft is a blimp.

30. The method of claim 27, wherein said surface comprises a surface vehicle.

31. The method of claim 30, wherein said surface vehicle is a truck.

32. The method of claim 30, wherein said surface vehicle is a boat.

33. The method of claim 27, wherein said test propagation signals comprise cellular telephone frequencies.

34. The method of claim 27, wherein said test propagation signals comprise any frequency signal in the electromagnetic spectrum.

* * * * *